United States Patent [19]
Gurule

[11] Patent Number: 5,697,601
[45] Date of Patent: Dec. 16, 1997

[54] TWO-WAY DUAL ACTION CLAMP

[75] Inventor: James J. Gurule, Pleasanton, Calif.

[73] Assignee: Adjustable Clamp, Chicago, Ill.

[21] Appl. No.: 700,006

[22] Filed: Aug. 20, 1996

[51] Int. Cl.$^6$ ....................................................... B25B 1/20
[52] U.S. Cl. ............................... 269/43; 269/156; 269/104
[58] Field of Search ..................... 269/43, 37, 104, 269/156, 87.3, 246, 244

[56] References Cited

U.S. PATENT DOCUMENTS

| | | |
|---|---|---|
| 1,194,666 | 8/1916 | Romanowksi . |
| 1,402,621 | 1/1922 | Knittel ....................... 269/156 |
| 1,476,628 | 12/1923 | Daniel et al. ............... 269/244 |
| 1,788,546 | 1/1931 | Schmieder .................. 269/37 |
| 1,841,196 | 1/1932 | Mass . |
| 2,599,010 | 6/1952 | Pemitz . |
| 2,642,905 | 6/1953 | Hewat ........................ 269/156 |
| 3,537,337 | 11/1970 | Best ............................ 269/87.3 |
| 4,093,202 | 6/1978 | Kincaid . |
| 4,316,605 | 2/1982 | Zachry et al. ............... 269/43 |
| 4,552,345 | 11/1985 | Benda et al. . |
| 4,957,257 | 9/1990 | Gonzalez .................... 269/156 |
| 5,005,813 | 4/1991 | Lawrence . |
| 5,192,060 | 3/1993 | Novak . |
| 5,318,391 | 6/1994 | Breiner ....................... 269/87.3 |
| 5,342,031 | 8/1994 | Yu-Fang . |

Primary Examiner—Timothy V. Eley
Assistant Examiner—Lee Wilson
Attorney, Agent, or Firm—Lockwood, Alex, Fitzgibbon & Cummings

[57] ABSTRACT

A two-way dual action clamp for accurately clamping together from directions at right angles to each other, two or more workpieces. The clamps are particularly useful in clamping the stiles of the face frames of cabinet units which are to be joined together during installation. Each clamp has two jaws, one L-shaped and one I-shaped which, when assembled together, form a U-shape. The jaws are manipulated by a hand operating screw so as to clamp together workpieces such as frame face stiles from opposite sides. A second hand operating screw carries a pressure plate and extends transversely through a threaded opening in the bite portion of the U-shape assembly. The pressure plate acts to clamp workpieces in a front-to-rear direction which are clamped in a side-to-side direction. If desired one of the jaws can be provided with a drill guide so that a hole for a screw can be accurately drilled in stiles or other workpieces that are clamped together and a screw installed while a clamp or clamps remain(s) in place.

5 Claims, 1 Drawing Sheet

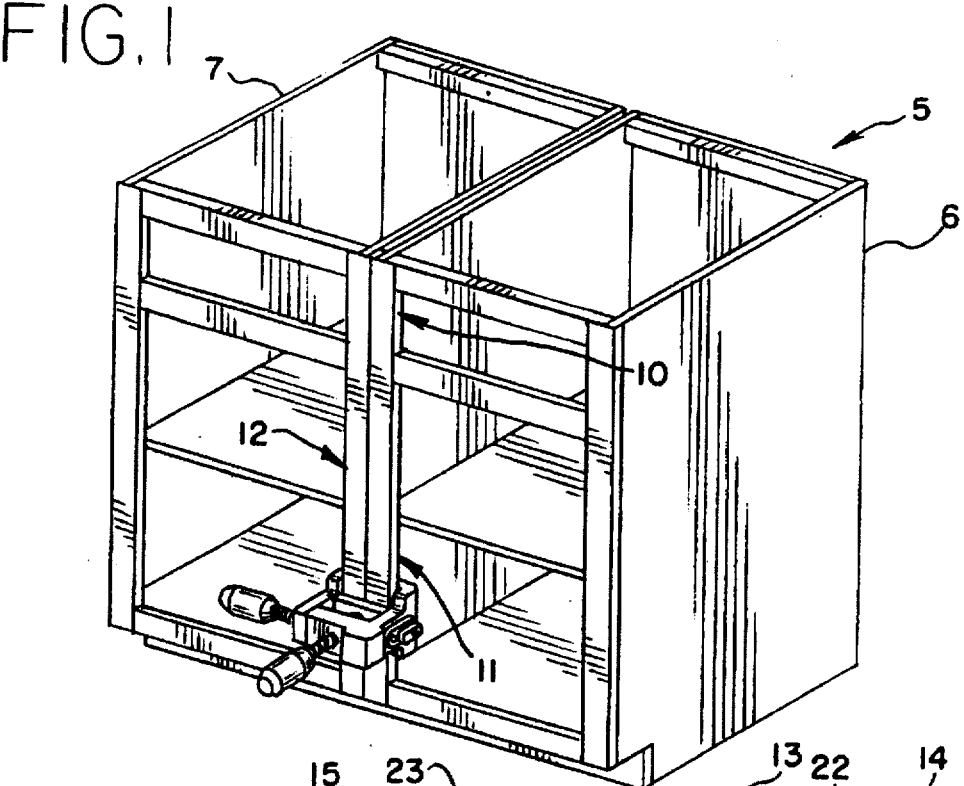
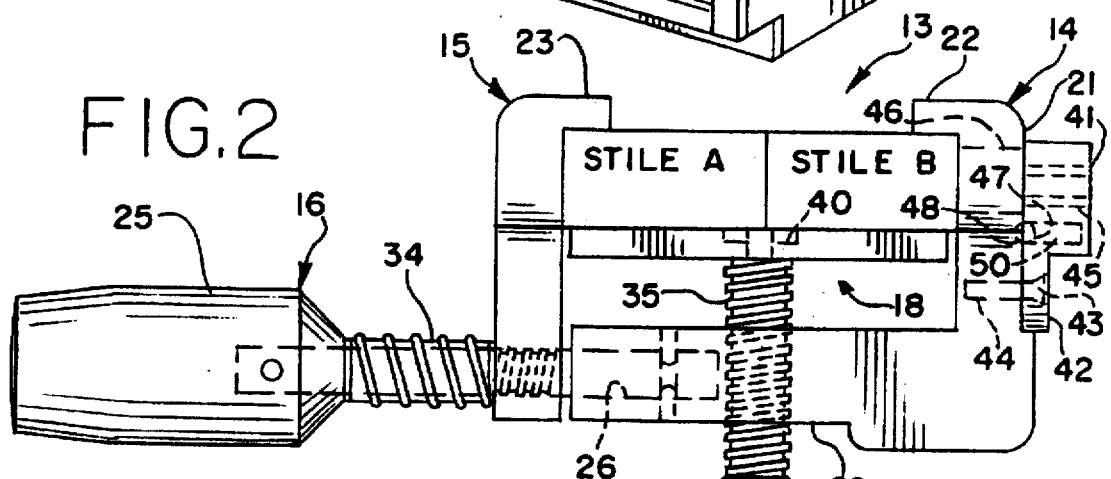
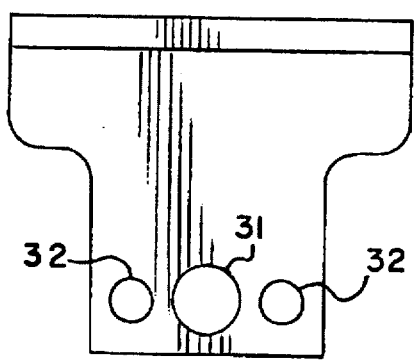

TWO-WAY DUAL ACTION CLAMP

BACKGROUND OF THE INVENTION

1. Field of the Invention

This invention relates generally to innovations and improvements in clamps for securing two or more workpieces together in precise relationship. More particularly, the invention relates to two-way dual action clamps for clamping workpieces together from directions at right angles to each other. The clamps of the invention have particular use in assembling and installing cabinets, especially in providing a high degree of accuracy in fastening cabinet face frames together in precise relationship one to the other. The cabinet clamps of the invention preferably incorporate drill guides for fast and accurate drilling holes to receive screws for retaining assembled cabinet sections together. The invention is particularly useful in assembling and installing multisectioned cabinets having face frames including stiles which must be accurately aligned in both side-by-side and front-to-rear directions prior to final installation.

2. Description of the Prior Art

A typical home kitchen may include fifteen cabinet units, the vast majority of which will have face frames. Currently, installers use "one-way" clamps such as C-clamps, bar clamps and various hand screw wood clamps in assembling and installing such cabinets. To make a first class installation of cabinets using such one-way clamps requires both considerable skill and time on the part of the installer. The two-way dual action clamps of the present invention allow an installer to install cabinets with face frames with greater accuracy and in much shorter times. By using the clamps of the present invention, installers can reduce a prior four-step process into a one-step process, improve the quality of installation, eliminate costly mistakes and allow the alignment of warped face frame stiles.

SUMMARY OF THE INVENTION

The object of the present invention generally stated is the provision of two-way dual action clamps which may be used by skilled and unskilled workers to accurately assemble and install cabinets with face frames in a relatively short period of time.

An important object of the invention is the provision of two-way dual action clamps which are economical to produce from conventional components which with normal usage remain in good working condition and free from appreciable wear during long periods of extensive use.

Other important objects of the invention will become apparent to those skilled in the art in the light of the following detailed description of a preferred embodiment taken in connection with the accompanying drawings, wherein:

BRIEF DESCRIPTION OF THE DRAWINGS

FIG. 1 is a perspective view of two conventional face frame cabinets fastened together with a clamp of the present invention prior to installation in a desired location;

FIG. 2 is a plan view of a two-way dual action clamp which forms a presently preferred embodiment of the invention; and FIG. 3 is an elevational view of the inner side of the left-hand jaw of the clamp shown in FIG. 2.

DESCRIPTION OF THE PREFERRED EMBODIMENT

In FIG. 1 a conventional cabinet is indicated generally at 5 formed of twin conventional face frame cabinet units 6 and 7, the stiles A and B of the face frames of which are joined together prior to installation of the assembled twin unit cabinet 5, for example, against a kitchen wall. Cabinet units 6 and 7 have face frames that should be accurately joined together before the assembled cabinet 5 is installed. Using one or more clamps of the present invention, the stiles A and B of the cabinet units 6 and 7 are first accurately joined together in side-by-side and front-to-rear relationship as shown, and while being so clamped, holes are drilled at locations 10, 11 and 12 for installing screws for holding the units 6 and 7 together. It will be seen that the screws installed at 10 and 11 will pass through holes in stile B and enter into stile A. Likewise, a screw installed at 12 will pass through stile A and enter into stile B.

In FIGS. 2 and 3 a two-way dual action clamp and its components are shown which may be used in accurately clamping together the stiles A and B of the cabinet 5 and in accurately drilling holes for the installation of screws at locations 10, 11 and 12, or at different or additional locations as may be desired. The two-way dual action clamp is indicated generally at 13 in FIGS. 1 and 2. The clamp 13 comprises 5 main components, namely, jaws indicated generally at 14 and 15, operating hand screws indicated generally at 16 and 17, and a pressure plate indicated generally at 18.

The jaw 14 is generally L-shaped while the jaw 15 is generally I-shaped. When assembled in clamp 13, the jaws 14 and 15 form a generally U-shaped assembly with one leg 20 of the jaw 14 forming the bight of the U-shape. The other leg 21 of the jaw 14 and the jaw 15 form the opposing legs of the U-shape. The distal ends of the jaws 14 and 15 have integrally formed aligned inturned projections 22 and 23, respectively, which as shown in FIG. 2 engage and retain stiles A and B clamped together therebetween.

The operating screw 16 comprises a screw 24 having a handle 25 secured to its outer end with its opposite end rotatably secured in a socket 26 formed in the distal end of the bight forming leg 20 of the jaw 14. In order to secure the end of the screw 24 in the socket 26, it is provided with a circumferential groove 27 and a pair of pins (not shown) are inserted in holes 28—28 in the jaw leg 20. It will be seen that the pins will prevent axial movement of the screw 24 relative to the jaw 14 while allowing the screw to be freely rotated in the socket 26.

The screw 24 has a relatively short threaded section 30 which extends in threaded engagement through an internally threaded bore 31 (FIG. 3) in the proximal end of the jaw 15. The jaw 15 is maintained in its oriented relationship with respect to jaw 14 by means of pins (not shown) press-fitted into openings 32—32 (FIG. 3) in the jaw 15 on opposite sides of the threaded bore 31 with protruding ends of the pins extending in sliding relationship into blind holes formed in the bight 20 of the jaw 14 on opposite sides of the socket 26.

A compression spring 34 may be fitted over the portion of the screw 24 between the handle 25 and the jaw 15 for maintaining the threaded engagement between the jaw 15 and the screw 24 when the jaw 15 is moved toward the handle 25.

It will be seen from FIG. 2 that when the screw 16 is rotated in one direction the jaw 15 will be moved toward the jaw 14 while when the screw 16 is rotated in the opposite direction, the jaw 15 will be retracted or moved away from the jaw 14.

The pressure plate operating screw 17 comprises a screw indicated generally at 35 to the outer end of which a handle 36 is attached. The threaded section 37 of the screw extends from the handle 36 to a hollow tip 38 over which the pressure plate 18 is rotatably secured. The pressure plate 18 has a circular recess in its outer face for receiving a washer 40 which is secured onto the end of the tip hollow and retains the pressure plate 18 in place on the screw 35. The washer 40 is retained in place by upsetting the end of the tip 38 after the washer 40 is in place.

The threaded section 37 of the screw 35 extends through the internally threaded opening 41 in the bight leg 20 of the jaw 14. It will be seen that by rotating the screw 17 the pressure plate 18 is advanced or withdrawn with respect to the inturned projections 22 and 23 on the distal ends of the jaws 14 and 15. While the jaws 14 and 15 clamp the stiles A and B together in side-by-side relationship, the pressure plate and the projections 22 and 23 clamp the stiles A and B in front-to-rear relationship.

Preferably a drill guide indicated generally at 39 is mounted on the outer side of the leg 21 of the jaw 14 as shown in FIG. 2. The drill guide 39 has an extended end portion 42 which is provided with a countersunk opening for receiving the head portion of a screw 43 the threaded shank of which is screwed into a tapped hole 44 in the jaw 14. The drill guide 39 is provided with a transverse opening into which is inserted a drill guide 45. The drill guide 45 is aligned with a substantially larger opening 46 extending transversely through the jaw 14. The opening 46 is large enough to accommodate the screw engaging end of a screw driver. The drill guide 45 may have a bore or opening for receiving a ⅛ inch or other size of drill.

In order to retain the drill guide 41 in place over the opening 46, a ball 47 (FIG. 2) is trapped in a dimple 48 in the surface of the jaw 14 and the end of an opposing hole 50 in inner face drill guide 39.

The operation of the two-way dual action clamp 13 will now be described in connection with securing together the stiles A and B of sections 6 and 7 of the cabinet 5.

The cabinet units 6 and 7 will be placed side-by-side in approximately the positions that they will occupy when secured together. While a single clamp 13 will suffice, preferably a pair of clamps 13 will be used. Each clamp 13 is opened by turning the screw 16 so as to separate the jaws 14 and 15 sufficiently so that they will fit over the stiles A and B. The operating screw 17 will be rotated so as to withdraw the pressure plate 18 sufficiently so as to allow the stiles A and B to fit between the jaws 14 and 15. The screw 16 is then turned so as to clamp the stiles between the jaws as shown in FIG. 2 while the operating screw 17 is turned so as to bring the pressure plate 18 into engagement with the stiles A and B. At this point the jaws 14 and 15 are not fully tightened against the sides of the stiles A and B and the pressure plate 18 likewise is not fully tightened against the stiles. With the stiles A and B brought into accurate side-by-side and front-to-rear relationship with respect to each other, the operating screws 16 and 17 are fully tightened thereby securing the stiles A and B and in turn, the cabinets 6 and 7, in accurately aligned relationship.

With a pair of clamps 13 in place and tightened, holes for screws may be drilled in the stiles A and B at two of the locations 10, 11 and 12 using the drill guide 39 on each clamp. The drill guides are then turned down so that screws may be inserted through the openings 46 in the leg 21 of jaw 14 and driven by a screw driver. With two screws in place the clamps 13 may be removed and one or more additional screws inserted. When one clamp 13 is used it will be moved to each desired screw location and a screw will be installed thereat.

What is claimed is:

1. A two-way dual action clamp for clamping multiple workpieces in desired alignment with each other, comprising:

a pair of clamping jaws assembled to form a U-shaped assembly, with the distal ends of the legs of the assembly having inwardly directed and longitudinally aligned workpiece retaining projections, a first clamp operating screw operably connected with said assembled jaws for causing said jaws to either separate or close together, a second clamp operating screw operably connected with a bight portion of said U-shaped assembly of said pair of clamping jaws and extending transversely in screw-threaded relationship therethrough, and a pressure plate mounted on the distal end of said second clamp operating screw for engaging workpieces clamped between said jaws for clamping said jaws into retaining engagement with said workpiece retaining projections, said first screw being longitudinally aligned with said bight portion of said U-shaped assembly.

2. The two-way dual action screw clamp of claim 1 having a drill guide support mounted on the outer side of one of said legs of said U-shaped assembly which faces away from the other leg with a drill guide supported therein having a drill guide receiving opening aligned with workpieces when clamped in said clamp, the leg of said U-shaped assembly having said drill guide supported thereon having a transverse opening in alignment with said drill guide sufficiently large to accommodate a screw driver whereby a drill extending through said drill guide can also extend through said leg and engage a workpiece clamped in said clamp.

3. The two-way dual action screw clamp of claim 2, wherein said drill guide support is pivotally mounted on said outer side of said leg whereby said drill guide can be moved into and out of said alignment with said transverse opening.

4. A two-way dual action screw clamp for clamping multiple workpieces in a desired alignment with each other, comprising:

a L-shaped jaw, an I-shaped jaw, said jaws being assembled to form a U-shaped assembly with one leg of said L-shaped jaw forming a bight portion of said U-shaped assembly and with the distal ends of said U-shaped assembly having inwardly directed and longitudinally aligned workpiece retaining projections, a first clamp operating screw operably connected with said jaws for causing said jaws to either separate or to close together, a second clamp operating screw operably connected with said bight portion forming leg and extending transversely in screw-threaded relationship therethrough, and a pressure plate mounted in free-to-rotate relationship on the distal end of said second screw for engaging workpieces clamped between said jaws and clamping said jaws into retaining engagement with said workpiece retaining projections, said first screw being longitudinally aligned with said bight portion forming leg and with the distal ends secured in free rotating relationship in the distal end of said bight portion forming leg and extending transversely in screw-threaded relationship through said I-shaped jaw.

5. The two-way dual action screw clamp of claim 4, wherein longitudinal axes of said first and second screws intersect at right angles.

* * * * *